(12) United States Patent
Wafzig et al.

(10) Patent No.: US 6,244,985 B1
(45) Date of Patent: Jun. 12, 2001

(54) INFINITELY VARIABLE TOROIDAL DRIVE

(75) Inventors: Jürgen Wafzig, Eriskirch; Walter Kuhn, Friedrichshafen, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/445,975
(22) PCT Filed: Jul. 20, 1998
(86) PCT No.: PCT/EP98/04494
§ 371 Date: Dec. 15, 1999
§ 102(e) Date: Dec. 15, 1999
(87) PCT Pub. No.: WO99/05433
PCT Pub. Date: Feb. 4, 1999

(30) Foreign Application Priority Data

Jul. 26, 1997 (DE) ............................................. 197 32 274

(51) Int. Cl.[7] ...................................................... F16H 15/38
(52) U.S. Cl. ................................................ 476/42; 476/33
(58) Field of Search ............................................ 476/33, 42

(56) References Cited

U.S. PATENT DOCUMENTS

| | | |
|---|---|---|
| 1,985,110 | 12/1934 | Sharpe . |
| 2,152,796 | 4/1939 | Erban . |
| 2,506,195 | 5/1950 | Bonna . |
| 2,762,232 | 9/1956 | Bade . |
| 3,739,658 | 6/1973 | Scheiter . |
| 3,826,148 | 7/1974 | Magill . |
| 4,893,517 | 1/1990 | Nakano . |
| 4,934,206 | 6/1990 | Nakano . |
| 5,033,322 | 7/1991 | Nakano . |
| 5,230,258 | 7/1993 | Nakano . |
| 5,254,056 | 10/1993 | Nakano . |

FOREIGN PATENT DOCUMENTS

| | | |
|---|---|---|
| 44 44 952 C2 | 6/1995 | (DE) . |
| 0 420 157 | 4/1991 | (EP) . |
| 0 459 291 | 12/1991 | (EP) . |
| 94 13 978 | 6/1994 | (WO) . |

OTHER PUBLICATIONS

Japanese Abstract, JP 01 193454 A, vol. 013, No. 489 (M–888) dated Nov. 7, 1989 to Nissan Motor.

*Primary Examiner*—Allan D. Herrmann
(74) *Attorney, Agent, or Firm*—Davis & Bujold, P.L.L.C.

(57) ABSTRACT

The invention relates to an infiflely variable toroidal drive comprising a housing 1, an input shaft 3, a torque shaft 34, two input discs 5, 15 with toroidal inner surfaces and two output discs 6, 16 with toroidal inner surfaces. One input disc and one output disc each form a pair and the two output discs are arranged next to each other and in mirror symmetry. The toroidal drive also comprises several friction wheels for transmitting a torque from the input disc to the corresponding output disc, an output shaft 10 and a gear wheel system 8, 9 between the output discs and the output shaft. A holding frame 2 is removably fastened to the drive housing 1, which frame consists of an upper frame clamp 28, a lower frame clamp 29 and a cup-shaped bearing support member 7. The lowerframe clamp 29 has a recess 45 and one end of the output shaft 10 is mounted via a bearing 32 in a rotating manner.

11 Claims, 2 Drawing Sheets

INFINITELY VARIABLE TOROIDAL DRIVE

BACKGROUND OF THE INVENTION

The invention concerns an infinitely variable toroidal drive.

Those infinitely variable toroidal drives usually have, co-axially disposed in relation to a common shaft, input and output discs which are arranged in pairs and have toroidal-shaped inner surfaces, friction wheels situated between the pairs of input and output discs. The friction wheels are in frictional contact both with the input discs and with the output discs and transmit the torque that has been transmitted to them by the input disc to the output disc by frictional contact, the rotational speed of the friction wheels being higher as greater is the distance between their contact point with the input disc and the axis of rotation. On the other hand, the rotational speed of the output disc is higher as nearer the contact point is between friction wheel and output disc to the axis of rotation. Accordingly, the rotational speed of the output disc can be infinitely and arbitrarily set by swiveling the friction wheels. To this end, the axes of rotation of the friction wheels are supported on a carrier which can be controlled via a swiveling device.

The basic principle of such infinitely variable toroidal drives has already been described in U.S. Pat. No. 2,152,796 published in the year 1939. In this publication are provided two pairs of concave input and output discs between which are disposed swiveling supported friction wheels so that a torque, transmitted via an input shaft to the input discs, and the friction wheels, according to the relative position of the friction wheels with a reduction ratio depending thereon, is fed via the input discs, a gear wheel step and a hollow shaft to a compound gear in the form of a planetary transmission. The web of the planetary transmission drives an output shaft which is connected with the input gears, e.g. of a motor vehicle. At the same time, the output shaft can be disposed parallel to and spaced from the output shaft. The output gear wheel and the two output discs are rotatably supported on a sleeve which, on its ends, is supported in bearing brackets. The arrangement of the bearing brackets between respective input and output shafts presupposes a sufficiently large installation space between the discs.

The transmission according to U.S. Pat. No. 3,739,658 also has a pull-and-push variator with two input and output discs arranged in pairs between which are situated tiltingly supported friction wheels. This construction includes a bearing bracket which is component part of the housing and spatially is horizontally placed between the two output discs. The power flowing from the output discs is fed to a hollow shaft via a planetary transmission that, in addition, acts as differential. The hollow shaft is non-rotatably connected with an output gear wheel and is rotatably retained by the ball bearings in bearing bracket.

The output gear wheel is drivingly connected with a gear wheel which is non-rotatably fastened on the housing of a torque converter. The latter drives the output shaft of the transmission. The arrangement of the torque converter on the input of the output shaft implies a relatively large axial distance between input and output shafts of the transmission. Thus, the occasions for use of the transmission are strictly limited, since the required installation space is not always available.

U.S. Pat. No. 4,893,517 has disclosed an infinitely variable toroidal drive having an input shaft that penetrates a housing. The housing is divided by a partition wall in two hollow spaces in each of which are situated an input disc and an output disc opposite each other with friction wheels therebetween, both the input disc and the output disc lying in both hollow spaces on a common axis toward which the friction wheel can be swung to attain the desired speed ratio. The two pairs of input discs and output discs are disposed in mirror symmetry to each other in both hollow spaces so that both output discs are next to each other, specifically at both sides of the partition wall separating from each other the two hollow spaces and in which a gear wheel is supported which is actuated with the output torque jointly by both output discs.

The torque is transmitted, via another gear wheel to the parallel output shaft thereby to penetrate only one of the two hollow spaces and be supported on the partition wall on one end.

The partition wall, together with the appertaining bearings and spacers, can be introduced in the housing and bolted therewith as a pre-assembled unit, however the possibility of pre-assemblage is limited to a few individual parts; therefore, the assembly cost for completing the transmission is still considerable. Another disadvantage of this transmission consists in that very strong forces are introduced in the transmission housing, which makes necessary strong construction with corresponding heavy weight.

U.S. Pat. No. 5,033,322 also has described an infinitely variable toroidal drive, having basically the same design as the above described toroidal, i.e. two transmission units each in the form of an input disc, an output disc and friction wheels pivotably supported therebetween. In order to prevent in such a toroidal drive, whenever one transmission unit is controlled by the control device, the carriers for the friction wheels of the other transmission unit being exposed to vibrations, a mechanical device is provided in this known toroidal drive which prevents the reciprocal movement of the first pair of carriers for the friction wheels and the second pair of carriers for the friction wheels. The device consists of upper and lower transverse links (i.e. yokes), which accommodate the bearings for the carriers (pivots) of the friction wheels and which are swingingly disposed around pivots fastened to the housing. In order to eliminate a relative movement to each other, the transverse links are rigidly interconnected by rods extending in longitudinal direction. Vibrations, acting upon the carriers due to the friction wheels, are limited so that the slip on the second transmission unit is reduced.

In the toroidal drive according to the U.S. Pat. No. 4,934,206, the output gear wheel is supported on one side by bearings in a partition wall and on it other side is connected to an output disc. For this connection, the output gear wheel is provided with a collar which, via a spline, provides a non-rotatable support and fastening of the other output disc on the output gear wheel. With strong torques, the non-rotatable connection of the output disc to the output gear wheel proves inadequate. Also the support of the output disc directly upon the transmission main shaft is unfavorably affected, since eccentricities are inevitable between the support and the outer diameter of the collar on the output gear wheel.

The invention is based on the problem of supporting and disposing the output shaft and the gear wheel fastened thereon so as to make possible easy assembly and a compact design.

SUMMARY OF THE INVENTION

The invention solves the stated problem in an infinitely variable toroidal drive.

The advantages attainable by the invention specifically consist in that the output shaft and the gear wheel non-rotatably connected therewith are supported and disposed in a manner such that simple assembly is possible while taking into consideration the available holding frame.

BRIEF DESCRIPTION OF THE DRAWINGS

The invention is explained in detail herebelow with a reference to the drawings in which is shown an advantageous embodiment of the invention. In the drawings.

DESCRIPTION OF THE PREFERRED EMBODIMENT

Figure 1:
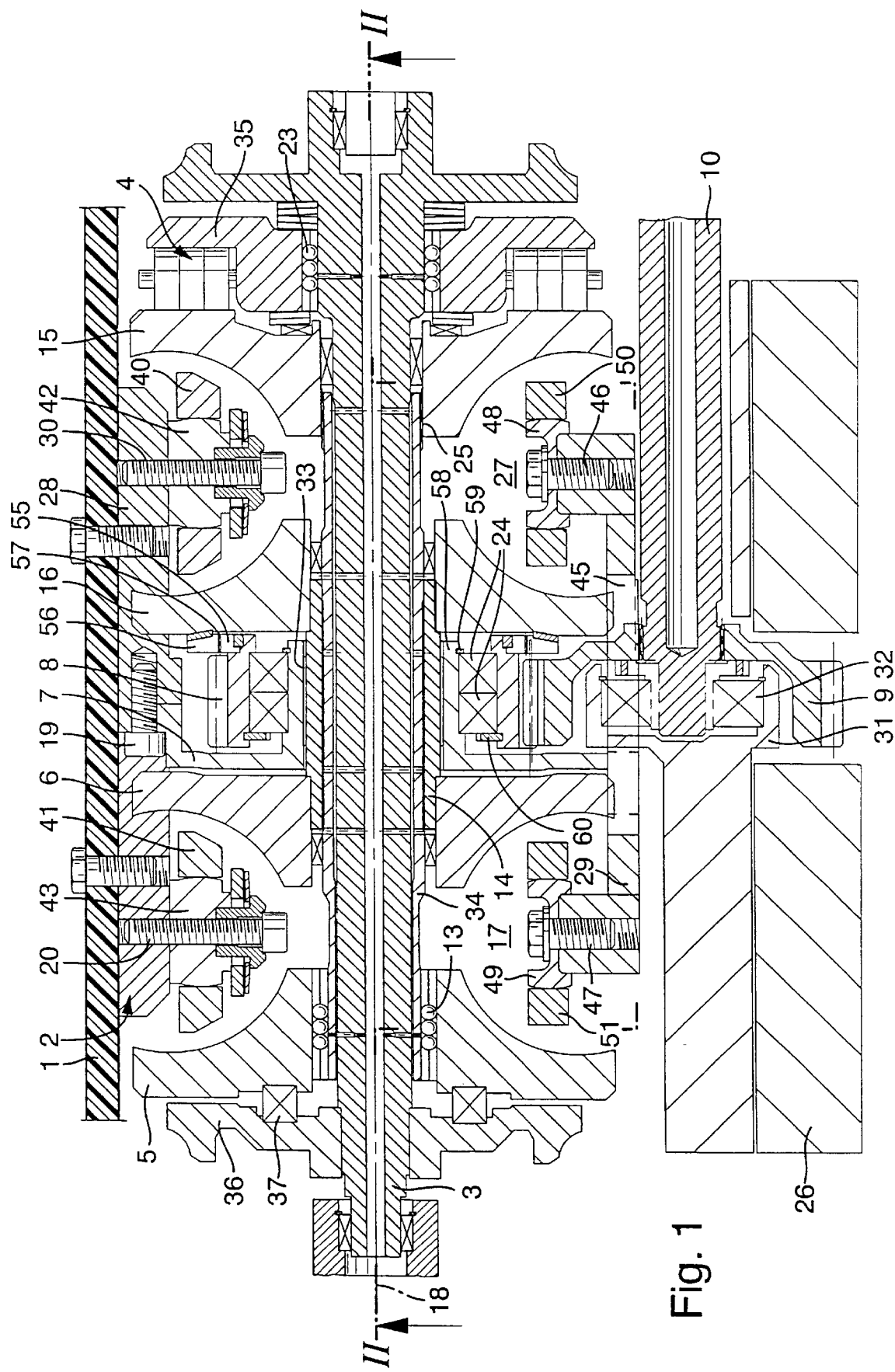
FIG. 1 is a vertical section through the toroidal drive according to the invention.

In the drawings, in which the same parts have been given the same reference numerals, 1 designates the housing of the friction wheel transmission (or toroidal drive), the input shaft 3 of which is connected with a starting element, not shown, such as a torque converter or a wet-operating starting clutch of a prime mover of a motor vehicle. In the housing 1, two transmission units are co-axially disposed in relation to the input shaft 3. One transmission unit has an input disc 5 and an output disc 6 the surfaces of which, facing each other, have toroidal shape; the other transmission unit has an input disc 15 and, situated opposite to it, an output disc 16 the surfaces of which, facing each other, likewise have toroidal shape. In each transmission unit two friction wheels 11, 21 are preferably provided which are fastened on tiltable carriers 12, 22 so that they can be pivoted relative to the longitudinal axis 18 of the input shaft 3. The friction wheels 11, 21 are in frictional contact with the two surfaces that face it of the input discs 5, 15 and of the output discs 6, 16 the friction wheels of one transmission unit being disposed symmetrically relative to the axis of the input shaft 3.

Figure 2:
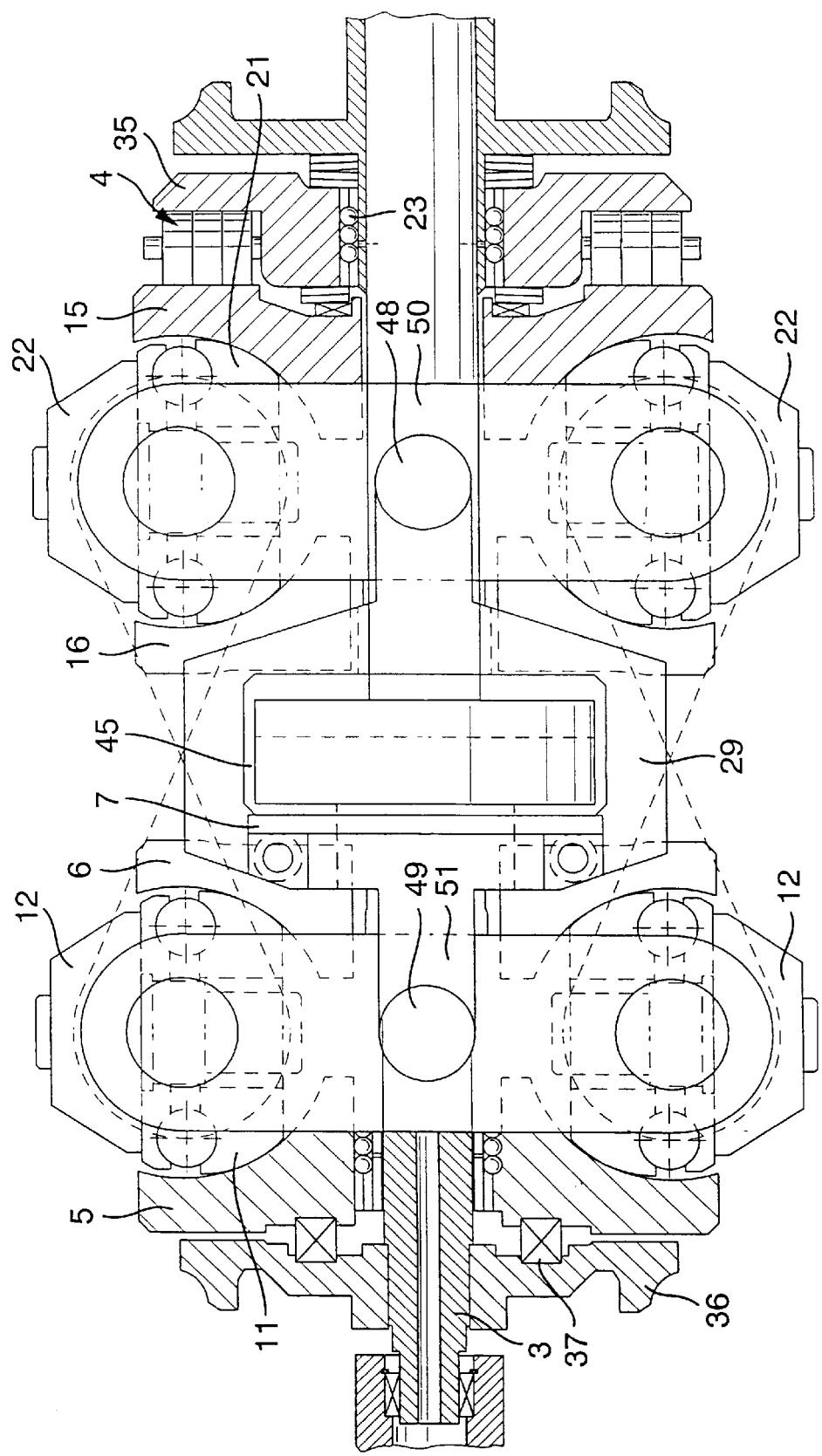
FIG. 2 is a section offset by 90° thereto along the line II—II of FIG. 1.

If the friction wheels 11, 21 are now inclined by a pivoting device, not shown, in particular, in relation to the longitudinal axis of the input shaft 3, the contact points of the periphery of the friction wheels 11, 21 move from the position shown in FIG. 2 along the toroidal surfaces, both of the input discs and the output discs, whereby the reduction ratio between an input and an output speed can be continuously, i.e. infinitely set.

All discs 5, 15, 6, 16 are supported on a torque shaft 34 which is slightly moveable in axial direction relative to the housing 1; the input disc 5 of one transmission unit is non-rotatably fastened with the torque shaft at 13, but supported thereon axially slidingly. The input disc 15 of the other transmission unit is also non-rotatably connected with the torque shaft by engaging teeth 25. Both output discs 6, 16 of both transmission units, which are disposed in the transmission with mirror symmetry and next to each other, are fixedly situated on a common bushingb 14, the output disc 16 being firmly connected with a gear wheel which rotatably surrounds the torque shaft 34. A torque transmitted by one input disc 5 to the output disc 6 and a torque transmitted by the other input disc 15 to the output disc 16 is in this way transmitted by both output discs non-rotatably connected with the bushing 14 to the gear wheel 8 that meshes with a gear wheel 9 firmly connected with the output shaft 10. The bearing 24 is designated for the gear wheel 8 and the bearing 32 is designated for the output shaft 10.

The non-rotatably connection of the output disc with the output gear wheel 8 is preferably constructed as follows:

On the output gear wheel 8, an inner ring 55 (lying to the right in the drawing) is non-rotatably placed, e.g. by welding. The inner ring has an outer spline on its outer periphery. The outer spline meshes an inner spline of an outer ring 56. The inner and outer splines of the inner ring 55 and outer ring 56 together form engaging splines 57.

The outer ring 56 is non-rotatably connected with the output disc 16, e.g. by welding. In this manner, between the output disc 16 and the output gear wheel 8, a non-rotatably connection exists by which the proportionate powers of the output discs 6, 16 are added up and passed to the output gear wheel 8 and finally to the gear wheel 9 of the output shaft 10.

Instead of the welded connections, insofar as allowed by the installation conditions, it is possible to use screw connections to fasten the inner ring 55 or the outer ring 56.

In an alternative embodiment, it is entirely possible to omit the inner ring 55. Part of the teeth of the output gear wheel 8, which anyway exists, can be used as part of the engagement splines. The inner spline of the outer ring 56 would then be adapted to the teeth of the output gear wheel splines.

On one hand, the described non-rotatable connection between the output disc 16 and the output gearwheel 8 allows the transmission of strong torques and, on the other hand, simple assemblage is ensured, since the drag connection by the axial displacement of the output disc 16 in direction of the output gear wheel 8 is almost automatically produced. The drag connection described has, in addition, the advantage that it requires not much space in an axial direction of the transmission.

The bearing 24 for support of the output gear wheel 8 are situated next to each other upon a collar 58 of the cup-shaped bearing support member 7. The inner rings of the bearing 24 remain stationary in relation to the collar 58 while the outer rings of the bearing 24 rotate together with the output gear wheel 8. The bearings disposed next to each other in the axial direction assume an axial length that substantially corresponds to the tooth width of the output gear wheel 8. A special axially short design can be obtained because of the above described arrangement. Each bearing 24 is secured in axial direction by a retainer ring 59 on the collar 58 and retainer ring 60 on the output gear wheel 8. During the assemblage the output gear wheel 8, together with the bearing 24, are slipped, as a pre-assembled unit, upon the collar 58 and secured with the retainer ring 59.

A cylindrical pressure device 4 is provided between the input disc 15 with a curved path and a disc 35 with a curved path and is supported movably in axial direction upon the input shaft by the bearing 23 and non-rotatably connected with the input shaft, actuating with the aid of the pressure device 4 in the input disc 15 in axial direction toward the output disc 16. An axial disc 36 supports itself on the input disc 5, via a bearing 37. The input disc 5 is moved by the input shaft 3 toward the output disc 6 via the axial disc 36.

A cup-shaped bearing support member 7 is axially traversed by the torque shaft 34 and the bushing 14. The bearing support member is placed between the gear wheel 8 and the output disc 6 so as to separate the parts from each other. It is shaped in such a manner that it accommodates the gear wheel 8 firmly connected with the output disc 6. The output gear wheel 9 of the output shaft 10 meshes with the gear wheel 8.

The bushing 14 is supported in the hole of the cup-shaped bearing support member 7 by a needle bearing 33. The bearing support member 7 supports itself on a holding frame 2 situated in the housing 1. It is removably or permanently connected, i.e. screwed or welded, with an upper and a lower frame clamp 28, 29. The holding frame 2 is formed by the bearing support member 7 and the upper and the lower frame clamps 28, 29. The frame clamps carry, via pivots 42, 43, upper transverse yokes 40, 41 and via pivots 48, 49 lower transverse yokes 50, 51 in which are supported the carriers 12, 22 for the friction wheels 11, 21.

On the output side of the gear wheel 8, the support has a vertical bearing inner ring so that the output gear wheel rotates with the outer ring of the support. By virtue of the design of the bearing support member and the arrangement of the bearing 24, an axially relatively short toroidal drive design is possible despite gear wheels 8, 9 which are wider and thus capable of bearing heavy loads.

A fastening device 19, such as a screw construction is between the cup-shaped bearing support member 7 and the holding frame 2. With 20, 30 are designated fastening devices for the pivots 42, 43 of the transverse yokes 40, 41 and with 46, 47 fastening devices for the pivots 48 and 49 of the transverse yokes 50, 51.

The output shaft is supported with its bearing 32 in a holding part 31 which is partly sunk in the recess 45 of the lower frame clamp 29. At the same time, the bearing 32 is surrounded by the input gear wheel 9 while the holding part 31 supports itself upon the transmission housing or is fastened in the holding frame 2 or on the hydraulic control 26, as shown. The bearing 32 is removably secured to the holding part 31; when the output shaft 10 rotates, the inner ring or the outer ring of the bearing 32 can remain stationary.

According to the invention during the operation of the toroidal drive, the torque originating, e.g. from the engine of a motor vehicle, is transmitted via the input shaft and the pressure device 4, 35 to the input disc 15 which, in turn, feeds the torque transmitted to it to the output disc 16 via the corresponding friction wheels; besides, the torque of the input disc 15 is transmitted via the engagement gears 25 to the torque shaft 34 and via the corresponding bearing 13 to the input disc 5 which, in turn, actuates the output disc 6 via the corresponding friction wheels. Therefore, both in the first and in the second transmission units the torque is transmitted by the input disc to the output disc, via the friction wheels, situated therebetween which roll in preselected incline planes.

Both output discs 6, 16 jointly actuate the gear wheel 8 which transmits the output power with the desired reduction ratio to the output shaft 10 via the output gear wheel 9.

| Reference numerals |
| --- |
| 1 housing |
| 2 holding frame |
| 3 input shaft |
| 4 pressure device |
| 5 input disc |
| 6 output disc |
| 7 bearing support member |
| 8 gear wheel |
| 9 gear wheel |
| 10 output shaft |
| 11 friction wheel |
| 12 carrier |
| 13 bearing |
| 14 bushing |
| 15 input disc |
| 16 output disc |
| 17 hollow space |

| -continued |
| --- |
| Reference numerals |
| 18 longitudinal axis |
| 19 fastening device |
| 20 fastening device |
| 21 friction wheel |
| 22 carrier |
| 23 bearing |
| 24 bearing |
| 25 engaging gear |
| 26 hydraulic control |
| 27 hollow space |
| 28 upper frame clamp |
| 29 lower frame clamp |
| 30 fastening device |
| 31 holding part |
| 32 bearing |
| 33 needle bearing |
| 34 torque shaft |
| 35 disc with curved path |
| 36 axial disc |
| 37 bearing |
| 38 threaded opening |
| 39 connecting opening |
| 40 upper transverse yoke |
| 41 upper transverse yoke |
| 42 pivot |
| 43 pivot |
| 44 link |
| 45 recess |
| 46 fastening device |
| 47 fastening device |
| 48 pivot |
| 49 pivot |
| 50 lower transverse yoke |
| 51 lower transverse yoke |
| 55 inner ring |
| 56 outer ring |
| 57 engaging splines |
| 58 collar |
| 59 retainer ring |
| 60 retainer ring |

What is claimed is:

1. An infinitely variable toroidal drive having:

a housing (1);

an input shaft (3);

two input discs (5, 15) with toroidal inner surfaces disposed co-axially relative to said input shaft;

a torque shaft (34) disposed co-axially relative to said input shaft for torque transmission;

two output discs (6, 16) with toroidal inner surfaces connected for torque transmission and disposed coaxially relative to said input shaft;

wherein the input discs and the output discs together form a pair of inputs to the output discs each defining a toroidal cavity with the output discs disposed adjacent one another;

a plurality of friction wheels (11, 21) having axes which are pivotally disposed between the toroidal surfaces of said pairs of input discs and said output discs for transmitting a torque from each input disc to a corresponding output disc;

a tiltable carrier (12, 22) for each friction wheel (11, 21) to pivot the axes of the friction wheels;

a pressure system (4) which interacts with one input disc (15) to bias said one input disc (15) toward said output discs and the other input disc (5);

First and second gears (8, 9), the first gear (9) is connected with an output shaft (10) and the second gear (8) is located between said output discs and receives from said output discs output torque to be transmitted;

a first and a second bearing support means (7, 31) said first bearing support means (7) supports a first bearing (24) and said second gear (8) rotates on the first bearing (24) and is connected for torque transmission received from said output discs, and one end of said output shaft (10) is supported via a second bearing (32) supported by said second bearing support means (31);

a holding frame (2), which has an upper frame clamp (28) and a lower frame clamp (29), is fastened to said transmission housing (1);

said first bearing support means (7) is cup-shaped and connects said upper frame clamp (28) with said lower frame clamp (29);

said lower frame clamp (29) has a recess (45) which partially houses the first gear (9); and said second bearing (32) that supports one end of said output shaft is situated in said second bearing support means (31).

2. The toroidal drive according to claim 1, wherein said first gear (9) circumferentially surrounds the second bearing (32).

3. The toroidal drive according to claim 1, wherein said second bearing support means (31) is supported by one of said transmission housing and said holding frame (2).

4. An infinitely variable toroidal drive having:

a housing (1);

an input shaft (3);

two input discs (5, 15) disposed co-axially with respect to said input shaft, and each of the two input discs (5, 15) having a toroidal inner surface;

a torque shaft (34) disposed co-axially with respect to said input shaft for torque transmission;

two output discs (6, 16) disposed co-axially with respect to said input shaft, and each of the two output discs (6, 16) having a toroidal inner surface for torque transmission;

wherein the output discs are disposed adjacent one another and each one of the input discs together with one of the output discs forms an input for torque transmission;

a plurality of friction wheels (11, 21) are located between the toroidal surfaces of adjacent pairs of input and output discs for transmitting torque from the input discs to the output discs, and each of the plurality of friction wheels (11, 21) is pivotal about a pivot axis;

a tiltable carrier (12, 22) supports the plurality of friction wheels (11 21) to facilitate pivoting of the axes of the plurality of friction wheels;

a pressure system (4) biases one of the input discs (15) toward the other in put disc (5) to facilitate sandwiching the two output discs between the two input discs (5, 15);

first and second gears (8, 9) for transmitting torque, the first gear (9) is supported by a first end of an output shaft (10) and the second gear (8) is located between the two output discs and receives the output torque to be transmitted from the two output discs;

first and second bearing supports (7, 31), the first bearing support (7) supports a first bearing (24) and the second gear (8) rotates on the first bearing (24) and is connected to at least one of the two output discs for receiving torque to be transmitted, and the first end of the output shaft (10) is supported via a second bearing (32) supported by said second bearing support (31);

a holding frame (2) is fastened to said transmission housing (1) and the holding frame (2) has an upper frame clamp (28) and a lower frame clamp (29);

the first bearing support (7) connects said upper frame clamp (28) with said lower frame clamp (29); and said lower frame clamp (29) has a recess (45) which partially houses the first gear,(9).

5. The toroidal drive according to claim 4, wherein the first gear (9) circumferentially surrounds the second bearing (32).

6. The toroidal drive according to claim 4, wherein the second bearing support (31) is supported by the transmission housing (1).

7. The toroidal drive according to claim 4, wherein the second bearing support (31) is supported by the holding frame (2).

8. An infinitely variable toroidal drive having:

a housing (1);

an input shaft (3);

a first input disc (5) and a second input disc (15) each input disc having a toroidal inner surface disposed co-axially to the input shaft;

a torque shaft (34) connected to said first and second input discs (5, 15) for torque transmission, the torque shaft (34) disposed co-axially to the input shaft (3); and a first output disc (6) having a toroidal inner surface, said first output disc disposed coaxially to the input shaft;

a second output disc (16) having a toroidal inner surface, said second output disc disposed coaxially to the input shaft;

wherein:

said output discs (6, 16) being disposed proximate each other in mirror symmetry, said first input disc (5) and said first output disc (6) forming a first pair of input to output discs, and said second input disc (15) and said second output disc (16) forming a second pair of input to output discs;

a plurality of friction wheels (11, 21) each having a pivot axis disposed between the toroidal surfaces of each first and second disc pair, said plurality of friction wheels transmitting torque between each input disc and each output disc of each said disc pair;

a tiltable carrier (12,22) for each friction wheel (11, 21) facilitates pivoting of the axis of each friction wheel;

a pressure system (4) interacting with the second input disc (15) to bias the second input disc (15) toward the first input disc (5) and sandwich the first and second output discs therebetween;

a first gear (9) connected with an output shaft (10);

a second gear (8) disposed between the first and second output discs, said second gear receives output torque from the output discs;

a bearing support means (7) supporting a first bearing (24) which facilitates rotation of the second gear (8);

a holding part (31) supporting, via a second bearing (32), a first end of the output shaft (10);

a holding frame (2) removably fastened to the transmission housing (1), the holding frame (2) having an upper frame clamp (28) and a lower frame clamp (29), the bearing support means (7) is cup-shaped and connects the upper frame clamp (28) with the lower frame clamp (29);

the lower frame clamp (29) has a recess (45), and said recess at least partially houses the first gear (9) in the holding part (31); and the second bearing (32) is disposed in the holding part (31), and the second bearing supporting the first end of the output shaft.

9. The toroidal drive according to claim 8, wherein the first gear (9) circumferentially surrounds the first bearing (32).

10. The toroidal drive according to claim 8, wherein the holding part (31) is supported by the transmission housing (1).

11. The toroidal drive according to claim 8, wherein the holding part (31) is supported by the holding frame (2).

* * * * *